US009442641B2

(12) United States Patent
Asakimori

(10) Patent No.: US 9,442,641 B2
(45) Date of Patent: Sep. 13, 2016

(54) OPERATION UNIT-EQUIPPED DEVICE, INFORMATION PROCESSING METHOD, AND COMPUTER PROGRAM PRODUCT

(71) Applicant: Hiroki Asakimori, Tokyo (JP)

(72) Inventor: Hiroki Asakimori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/613,976

(22) Filed: Feb. 4, 2015

(65) Prior Publication Data

US 2015/0242252 A1    Aug. 27, 2015

(30) Foreign Application Priority Data

Feb. 25, 2014  (JP) ................................. 2014-034540

(51) Int. Cl.
 *G06F 3/0484* (2013.01)
 *G06F 9/48* (2006.01)

(52) U.S. Cl.
 CPC ........... *G06F 3/0484* (2013.01); *G06F 9/4843* (2013.01)

(58) Field of Classification Search
 None
 See application file for complete search history.

(56) References Cited

U.S. PATENT DOCUMENTS

| 7,146,617 | B2 | 12/2006 | Mukundan et al. |
| 8,146,097 | B2 | 3/2012 | Mukundan et al. |
| 8,560,107 | B2 * | 10/2013 | Ueda ................ G05B 19/41845 365/185.08 |
| 2007/0283253 | A1 | 12/2007 | Asakimori et al. |
| 2009/0089076 | A1 | 4/2009 | Asakimori et al. |
| 2010/0125841 | A1 * | 5/2010 | Bauer ................ G06F 11/1433 717/174 |
| 2013/0038893 | A1 | 2/2013 | Katoh et al. |
| 2014/0013271 | A1 * | 1/2014 | Moore ................ G06F 3/0482 715/792 |
| 2015/0058826 | A1 * | 2/2015 | Hu ................ G06F 11/362 717/128 |
| 2015/0161177 | A1 * | 6/2015 | Singh ................ G06F 3/04842 707/722 |

FOREIGN PATENT DOCUMENTS

JP        2005-505050        2/2005

* cited by examiner

*Primary Examiner* — Tuan Dao
(74) *Attorney, Agent, or Firm* — Oblon, McClelland, Maier & Neustadt, L.L.P

(57) ABSTRACT

An operation unit-equipped device includes a generator that generates an application module including a processing executor that executes a processing, a display part that performs a display appropriated to the processing executor, and a controller that controls the processing executor and the display part; and a discard requester that requests, when at least one new processing executor and one new display part are generated after the generation of the processing executor and the display part, a discard of the processing executor and the display part generated previously. When there is an active processing in the processing executor generated previously when the request for discard is made, the controller discards the display part generated previously and maintains the processing executor generated previously until the active processing is completed, and discards the processing executor generated previously when the active processing in the processing executor generated previously is completed.

20 Claims, 10 Drawing Sheets

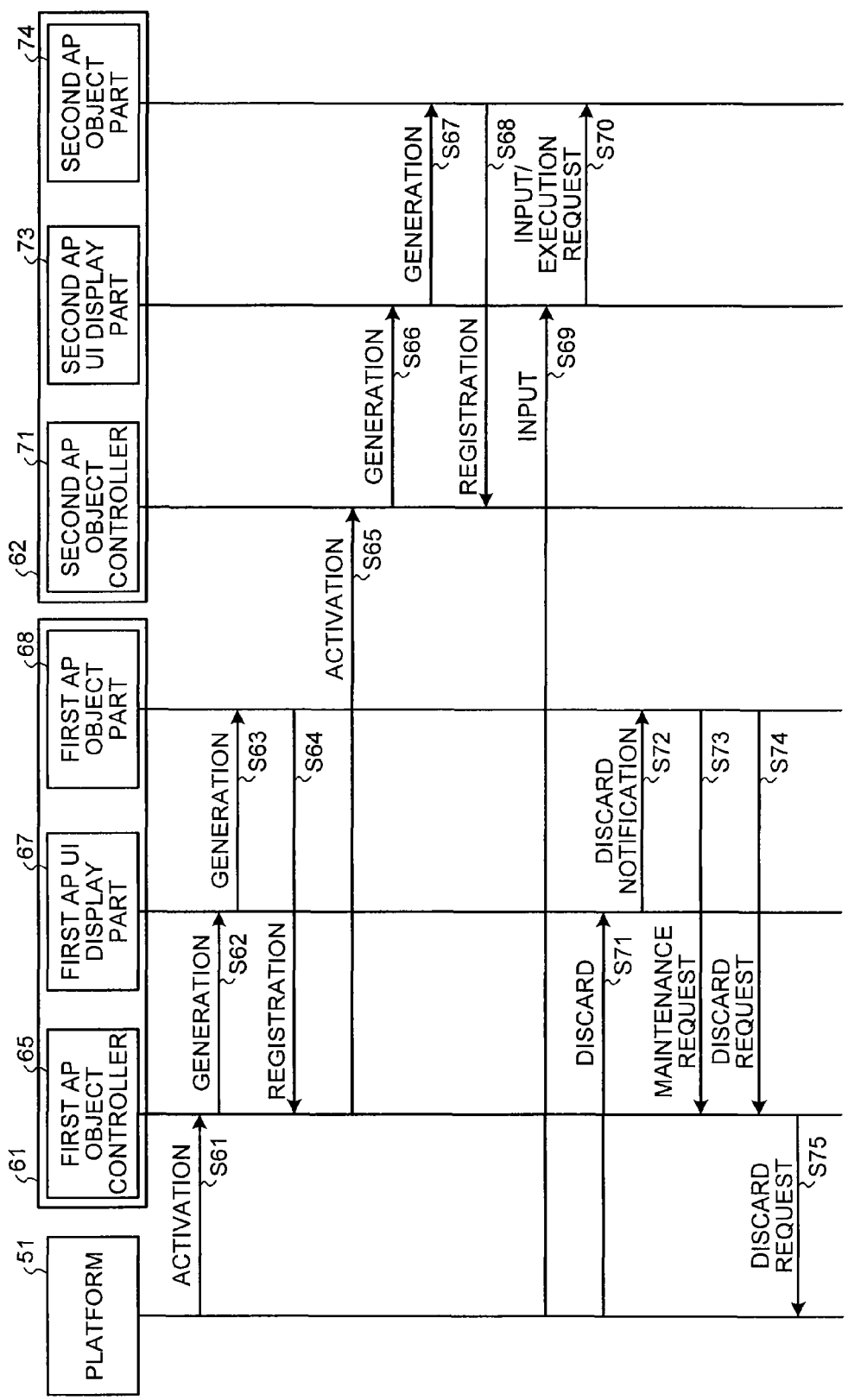

OPERATION UNIT-EQUIPPED DEVICE, INFORMATION PROCESSING METHOD, AND COMPUTER PROGRAM PRODUCT

CROSS-REFERENCE TO RELATED APPLICATION

The present application claims priority to and incorporates by reference the entire contents of Japanese Patent Application No. 2014-034540 filed in Japan on Feb. 25, 2014.

BACKGROUND OF THE INVENTION

1. Field of the Invention

The present invention relates to an operation unit-equipped device, an information processing method, and a computer program product.

2. Description of the Related Art

In recent years, a portable information processing terminal such as a smartphone and a tablet terminal device has been prevalent widely. A user, for example, causes a web application program to work on a portable information processing terminal to browse a desired web page and also causes a desired application program to work to obtain a desired function.

However, the portable information processing terminal such as a smartphone and a tablet terminal device has less resource than a stationary personal computer device and the like. There is therefore a possibility that a plurality of application programs working in parallel causes a working application to stop halfway due to a lack of the resource.

Therefore, there is a need for an operation unit-equipped device, an information processing method, and a computer program product which are capable of completing a processing that is switched to an execution in the background of a browser, for example.

SUMMARY OF THE INVENTION

It is an object of the present invention to at least partially solve the problems in the conventional technology.

According to an embodiment, there is provided an operation unit-equipped device that includes a generator configured to generate an application module that includes a processing executor configured to execute a processing, a display part configured to perform a display appropriated to the processing executor, and a controller configured to control the processing executor and the display part; and a discard requester configured to issue, when at least a new processing executor and a new display part are generated after the generation of the previous processing executor and the previous display part, a request to discard the previous processing executor and the previous display part generated. In response to the request to discard, the previous processing executor issues a request to maintain the previous processing executor to the controller when the previous processing executor is executing a processing, and the previous processing executor issues a request to discard the previous processing executor to the controller after the processing is completed. In response to the request to discard, the controller discards the previous display part and the previous processing executor when the previous processing executor is not executing a processing, the controller discards the previous display part and maintains the previous processing executor until a processing in the previous processing executor is completed when the previous processing executor is executing the processing, and the controller discards the previous processing executor when the processing in the previous processing executor is completed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a timeline chart for explaining an operation of completing a processing of an application module which is switched to a background execution in the MFP according to the third embodiment.

DETAILED DESCRIPTION OF THE PREFERRED EMBODIMENTS

For example, Japanese Translation of PCT International Application Publication No. 2005-505050 discloses a configuration of caching an object on a web server for the purpose of caching a view.

Here, the inventor of the present invention has been studying a possibility of making such a portable information processing terminal as explained above function as an operation unit of a device such as an image forming device, for example. For example, a possibility of enabling an operation screen of application programs of various kinds working on the device to be displayed in the portable information processing terminal has been studied.

A multifunction peripheral (MFP) according to an embodiment to which an operation unit-equipped device, an information processing method, and an information processing program according to the present invention are applied will be explained below as one example. Here, an MFP includes at least two functions among a printing function, a copying function, a scanner function, and a facsimile function.

Specifically, a browser object and a user interface (UI) object are synchronized with each other in a web application working on a browser, for example. When the resource becomes insufficient by activating another application or another web application together with the web application, the UI object is discarded (=the browser object is discarded) by a control of a platform. Since the web application working on the discarded browser object cannot be executed, the working web application suspends in the middle of the processing.

In other words, there is a problem that an application which is switched to an execution in the background of the browser suspends despite incompletion of the processing when the plurality of applications working in parallel cause the lack of resource in the conventional technique.

First Embodiment

Figure 1:
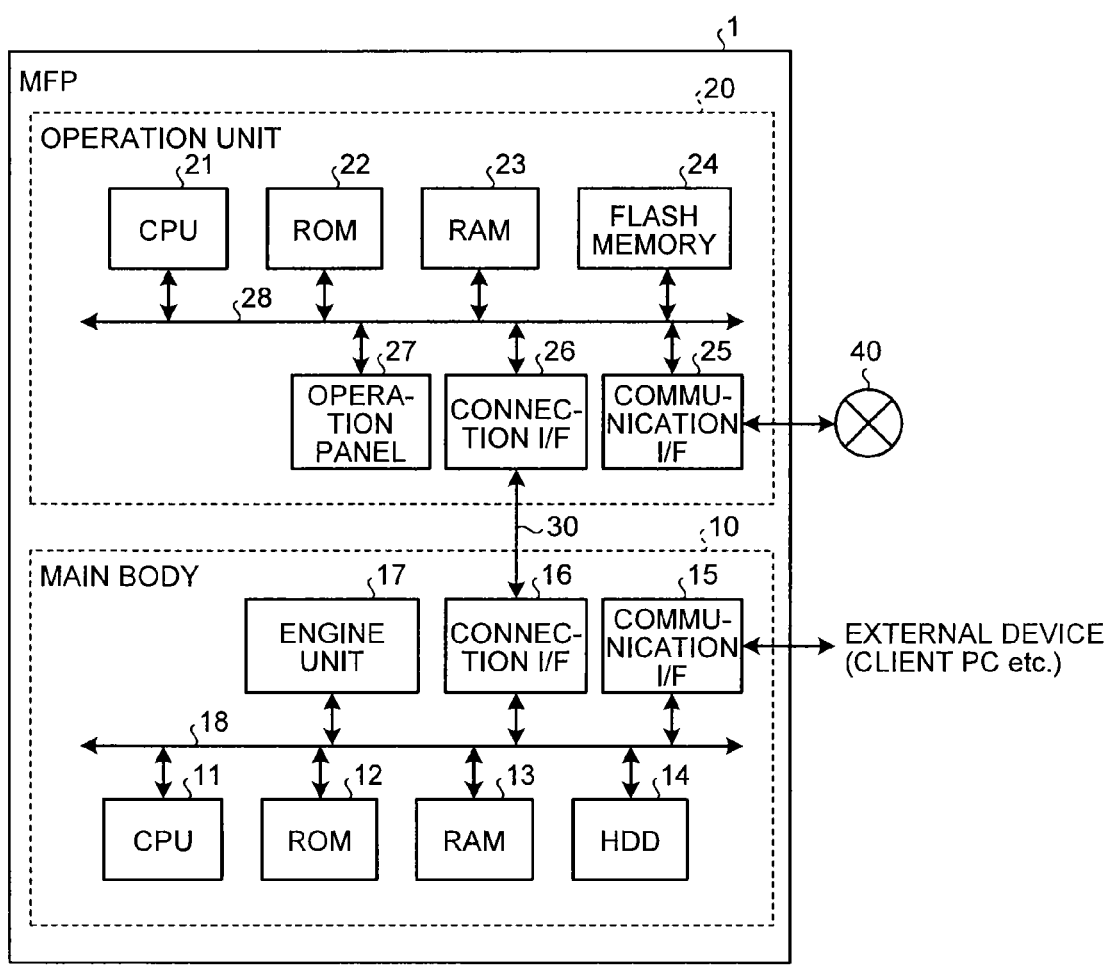
FIG. 1 illustrates a hardware configuration of an MFP according to a first embodiment.

FIG. 1 illustrates a hardware configuration of an MFP 1 according to a first embodiment. As illustrated in FIG. 1, the MFP 1 is provided with a main body 10 having a variety of functions including a copying function, a scanner function, a facsimile function, and a printing function and an operation unit 20 that receives an input appropriate to an operation by a user. The main body 10 and the operation unit 20 are connected via a dedicated communication channel 30 so that a communication therebetween is enabled. For the communication channel 30, while a universal serial bus (USB) standard may be adopted for example, an arbitrary standard may be adopted irrespective of being wired or wireless.

For example, an information processing terminal as an electronic device, such as a smartphone and a tablet terminal, capable of independently executing a complete information processing may be used as the operation unit 20. In this case, the information processing terminal used as the operation unit 20 functions as an operation unit of the MFP 1. Here, a simple mention "operation panel" below is assumed to indicate a fixed operation panel arranged in a conventional MFP 1.

More specifically, the information processing terminal used as the operation unit 20 is detachably connected to the MFP 1, instead of the fixed operation panel arranged conventionally as an operation unit dedicated to the MFP 1. In other words, the information processing terminal used as the operation unit 20 is arranged integrally with the MFP 1 while being detachable (separable) at a predetermined position such as a position where the operation panel of the MRP 1 is arranged, for example. Therefore, the information processing terminal used as the operation unit 20 and the MFP 1 may be recognized as one device. The information processing terminal as the operation unit 20 performs, when detached from the MFP 1, a wireless communication such as the Bluetooth® communication or an infrared communication with the MFP 1 and functions as an operation unit of the MFP 1.

The main body 10 operates in accordance with an input received in the operation unit 20. The main body 10 is enabled to communicate with an external device such as a client personal computer (PC) and to operate in accordance with an instruction received from the external device.

Next, a hardware configuration of the main body 10 will be explained. As illustrated in FIG. 1, the main body 10 is provided with a CPU 11, a ROM 12, a RAM 13, and a hard disk drive (HDD) 14. The main body 10 is also provided with a communication interface (I/F) 15, a connection I/F 16, and an engine unit 17. These components 11 to 17 are connected to each other via a system bus 18.

The CPU 11 totally controls an operation of the main body 10. The CPU 11 uses the RAM 13 as a work area (work space) and executes programs stored in the ROM 12 or the HDD 14 to control the entire operation of the main body 10 and realize various functions including the copying function, the scanner function, the facsimile function, and the printing function.

The communication I/F 15 is an interface that enables a communication with an external device such as a client PC. The connection I/F 16 is an interface that enables a communication with the operation unit 20 via the communication channel 30. While the communication channel 30 is illustrated with wire in FIGS. 1 and 2, the operation unit 20 is detachably provided in the main body 10 of the MFP 1 as explained above. Therefore, it is preferable to understand that the communication channel 30 functions as a wired communication channel when the operation unit 20 is attached to the MFP 1 and functions as a wireless communication channel when the operation unit 20 is detached from the MFP 1.

The engine unit 17 is a hardware that performs a processing, except for a versatile information processing and communication, for realizing the copying function, the scanner function, the facsimile function, and the printing function. For example, the engine unit 17 is provided with a scanner (image reading unit) that scans and reads out an image of a document, a plotter (an image forming unit) that performs printing onto a sheet member such as paper, a facsimile communication unit that performs a facsimile communication, and the like. The engine unit 17 may further be provided with special options such as a finisher that sorts printed sheet members and an automatic document feeder (ADF) that automatically feeds a document.

Next, a hardware configuration of the operation unit 20 will be explained. As illustrated in FIG. 1, the operation unit 20 is provided with a CPU 21, a ROM 22, a RAM 23, a flash memory 24, a communication I/F 25, a connection I/F 26, and an operation panel 27, which are connected to each other via a system bus 28.

The CPU 21 totally controls an operation of the operation unit 20. The CPU 21 uses the RAM 23 as a work area (work space) and executes programs stored in the ROM 22 or the flash memory 24 to control the entire operation of the operation unit 20. The CPU 21 then realizes various functions, which will be explained later, including a display of information (image) in accordance with an input received from a user.

The communication I/F 25 is an interface that enables a communication with a server device on a network 40, for example. The connection I/F 26 is an interface that enables a communication with the main body 10 via the communication channel 30.

The operation panel 27 receives inputs of various kinds in accordance with operations by a user and displays information of various kinds, for example, information appropriate to the received input, information indicating an operational status of the MFP 1, and information indicating a setting state. While the operation panel 27 is configured by a liquid crystal display (LCD) device equipped with a touch-screen function in this example, the configuration is not limited thereto. For example, the operation panel 27 may be configured by an organic EL display device equipped with the touch-screen function. Moreover, an operation unit such as a hardware key and a display unit such as a lamp may be provided in addition to this or in place of this.

Figure 2:
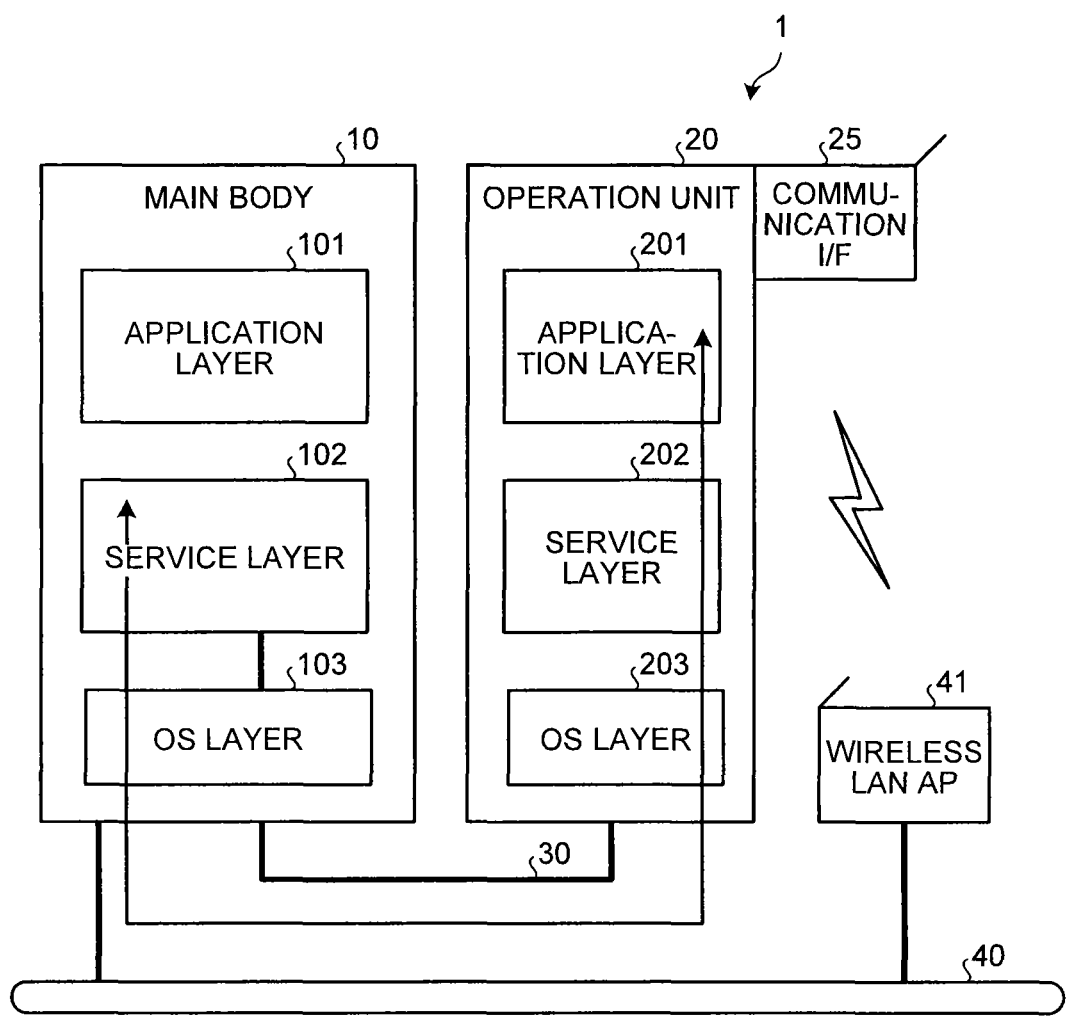
FIG. 2 illustrates a frame format of a software configuration of the MFP according to the first embodiment.

FIG. 2 illustrates an example of a software configuration of the MFP 1. As illustrated in FIG. 2, the main body 10 is provided with an application layer 101, a service layer 102, and an OS layer 103. The substances of the application layer 101, the service layer 102, and the OS layer 103 are various softwares stored in the ROM 12 and the HDD 14. The CPU 11 executes these softwares, so that various functions are provided.

A software of the application layer 101 is an application software (hereinafter sometimes referred to simply as "application" in the explanation below) for providing a predetermined function by operating a hardware resource. For such applications, a copy application that provides a copying function, a scanner application that provides a scanner function, a facsimile application that provides a facsimile function, and a printer application that provides a printing function can be listed, for example.

A software of the service layer 102 intervenes between the application layer 101 and the OS layer 103 and provides, with respect to an application, an interface that enables using a hardware resource provided in the main body 10. Specifically, the software of the service layer 102 provides a function of receiving an operation request to the hardware resource and performing an arbitration of operation requests. The operation request received by the service layer 102 may include a request for scanning by a scanner and a request for printing by a plotter.

The interface function by the service layer 102 is provided not only to the application layer 101 of the main body 10 but also to an application layer 201 of the operation unit 20. Specifically, the application layer 201 (application) of the operation unit 20 is also able to realize functions using the hardware resource (the engine unit 17, for example) of the main body 10 via the interface function of the service layer 102.

A software of the OS layer 103 is a basic software (operating system) for providing a basic function of controlling the hardware provided in the main body 10. The software of the service layer 102 converts a request for using the hardware resource from applications of various kinds into a command which can be interpreted by the OS layer 103 and passes the command to the OS layer 103. The software of the OS layer 103 executes the command, so that the hardware resource operates in accordance with the request from the applications.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body 10. However, the functions provided by the applications of the application layer 201 and the kinds of the operation requests which can be received by the service layer 202 are different from those of the main body 10. An application of the application layer 201 is a software for operating the hardware resource provided in the operation unit 20 and providing a predetermined function. The application of the application layer 201 is a software chiefly for providing a function as a user interface (UI) that allows an operation and a display with regard to functions, i.e., the copying function, the scanner function, the facsimile function, and the printing function, provided in the main body 10.

To maintain independence in function in the present embodiment, the software of the OS layer 103 of the main body 10 is different from the software of the OS layer 203 of the operation unit 20. In other words, the main body 10 and the operation unit 20 independently operate with each other by separated operating systems. For example, the Linux® may be used for the software of the OS layer 103 of the main body 10 and the Android® may be used for the software of the OS layer 203 of the operation unit 20.

By operating the main body 10 and the operation unit 20 by separated operating systems, the communication between the main body 10 and the operation unit 20 is performed not as an inter-process communication within a common device but as a communication between different devices. A transmission operation (command communication) of an input received by the operation unit 20 (a content instructed by a user) to the main body 10 and an operation, by the main body 10, of notifying the operation unit 20 of an event fall under this. Here, the function of the main body 10 can be used when the operation unit 20 performs a command communication with respect to the main body 10. The event to be notified by the main body 10 to the operation unit 20 includes an execution status of the operation in the main body 10 and a content which is set in the main body 10.

Since the power is supplied to the operation unit 20 from the main body 10 via the communication channel 30 in the present embodiment, it is possible to control a power source of the operation unit 20 separately (independently) from the control of the power source of the main body 10.

While the main body 10 and the operation unit 20 are electrically and physically connected via the communication channel 30 in this example, the operation unit 20 may be detachable from the main body 10. In this case, a short range communication unit such as an infrared communication unit, a radio frequency (RF) communication unit, and a Bluetooth® communication unit is provided in the main body 10 and the operation unit 20, for example. Or, the main body 10 and the operation unit 20 may be provided with a wireless LAN communication function such as the Wi-Fi® and may communicate with each other via a wireless LAN access point (wireless LANAP) 41 and the network 40 as illustrated in FIG. 2. Here, LAN is an abbreviation for a "Local Area Network". When the operation unit 20 is detachable from the main body 10, the operation unit 20 stores the electric power supplied from the main body 10 through the communication channel 30 in a secondary battery and uses the electric power stored in the secondary battery when detached from the main body 10 to operate and communicate with the main body 10.

In the MFP 1 with this configuration according to the first embodiment, applications stored in the main body 10 and the operation unit 20 work with a configuration to be explained below. This configuration allows completing the processing of even an application which is switched to a background execution in causing a plurality of applications to work in parallel. Here, the "application which is switched to a background execution" means an application which is activated previously and whose processing only is executed without display (or with a small display) while a processing as well as a display of another application activated later are executed. Since only the processing of the application program activated previously is executed in a manner of being hidden by the display of the application activated later, the expression "application which is switched to a background execution" is used here.

Figure 3:
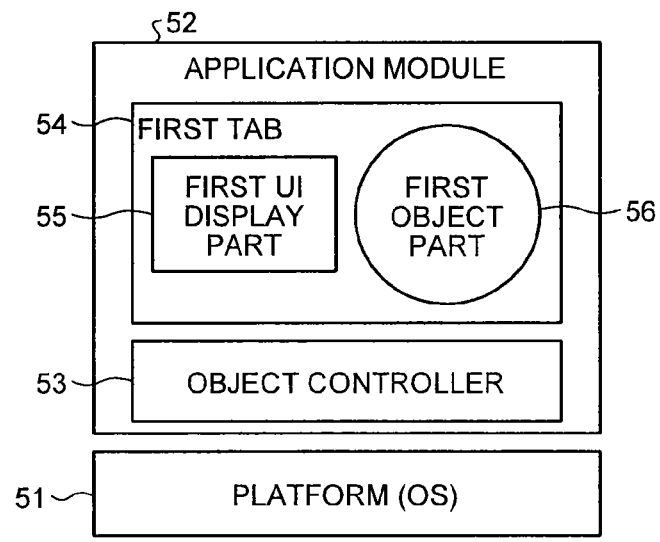
FIG. 3 is a functional block diagram for explaining a function of an application module activated on a platform in the MFP according to the first embodiment.

In FIG. 3, a platform (OS) 51 is a function provided by a universal OS such as the Linux® and the Android® stored in the OS layers 103 and 203. An application module 52 is a function to be provided by an application program stored in the application layers 101 and 201. The application module 52 is provided with an object controller 53 and a first tab 54. A tab like the first tab 54 is provided with a first user interface (UI) display part 55 and a first object part 56. The platform 51 is an example of a generator. The object controller 53 is an example of a controller. The UI display part 55 is an example of a display part. The object part 56 is an example of a processing executor.

The first UI display part 55 generates a user interface such as an image frame for display and the like. The first object part 56 obtains an object which is displayed within the image frame and the like generated by the first UI display part 55 via the network 40, for example. The application module 52 forms a plurality of tabs like the first tab 54 depending on the operation by a user and displays the latest tab or a tab specified by the user among the tabs. A not-displayed UI display part (first UI display part 55) among the generated tabs is compulsory ended (discarded) by a control of the platform 51 when a lack of resource is detected in the platform 51.

Figure 4:
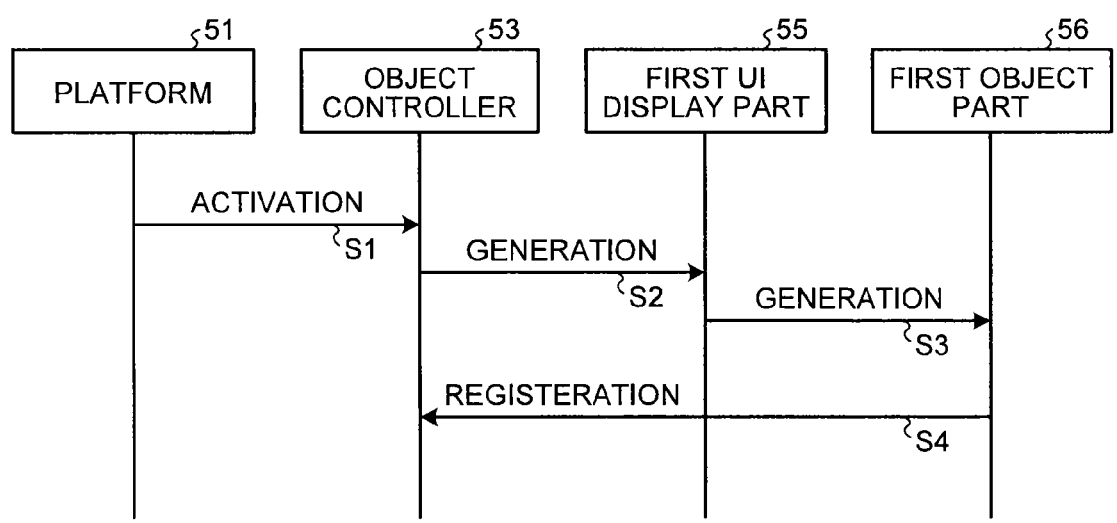
FIG. 4 is a timeline chart for explaining an operation in activating the application module in the MFP according to the first embodiment.

FIG. 4 is a timeline chart illustrating an operation of generating the first UI display part 55 and the first object part. At step S1, the platform 51 instructs the object controller 53 of the application module 52 of an application program whose activation is specified by the user to be activated. When activated by the activation instruction from the platform 51, the object controller 53 activates and controls the first UI display part 55 of the first tab 54 at step S2. The object controller 53 activates and controls the first object part 56 of the first tab 54 at step S3. The first object part 56, after activated, requests the object controller 53 to perform registration at step S4. The object controller 53 registers and puts under the control the first object part 56 in response to the registration request.

Figure 5:
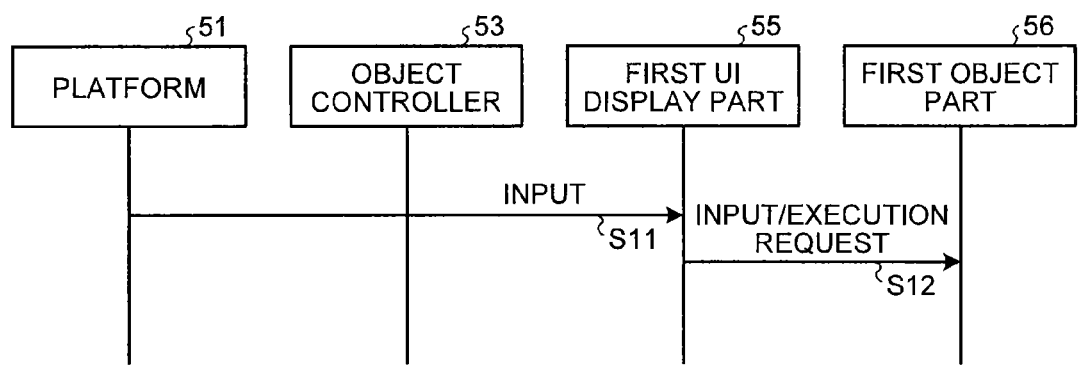
FIG. 5 is a timeline chart for explaining an operation in inputting the application module in the MFP according to the first embodiment.

FIG. 5 is a timeline chart for explaining a processing and an execution with respect to an input by a user. As illustrated in FIG. 5, an input by a user is provided to the first UI display part 55 directly from the platform 51 as shown at step S11 and notified to the first object part 56 as shown at step S12. The first object part 56 performs an application behavior in accordance with the input from the first UI display part 55 or an execution request.

Figure 6:
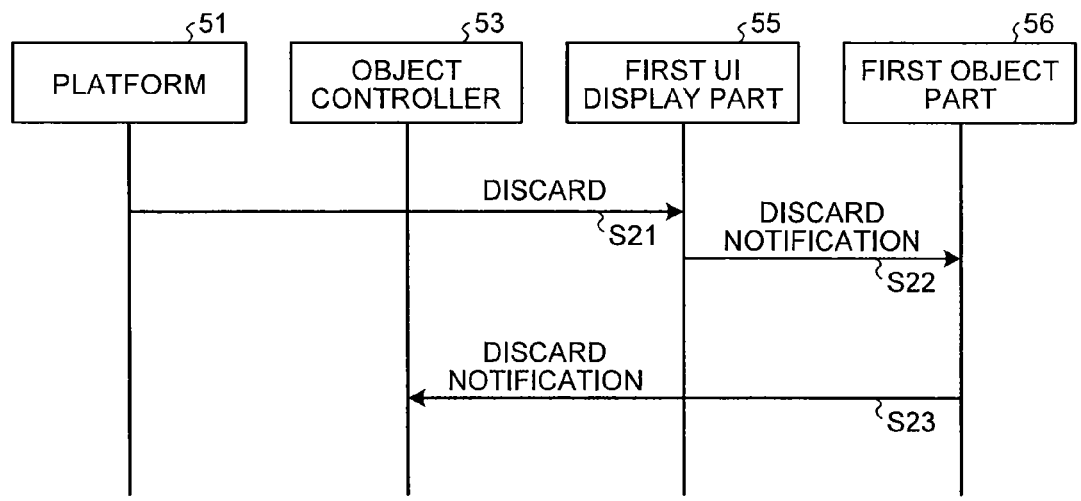
FIG. 6 is a timeline chart for explaining an operation in discarding the application module in the MFP according to the first embodiment.

FIG. 6 is a timeline chart for explaining an operation when an activation of a different application program is instructed by a user. In this case, the platform 51 notifies the first UI display part 55 which is made hidden of a discard as shown at step S21 in the wake of the switching of the displayed UI display part. The first UI display part 55 having received the discard notification notifies the first object part 56 of the discard at step S22. The first object part 56 having received the discard notification determines whether or not oneself is in the middle of execution of the processing. When determining that oneself is not in the middle of execution of the processing, the first object part 56 notifies the object controller 53 to ask for a discard of the first object part 56 (oneself) for the purpose of releasing the resource at step S23.

On the other hand, when determining that oneself is in the middle of execution of the processing, the first object part 56 is discarded conventionally in spite of being in the middle of execution of the processing. However in the case of the MFP 1 according to the embodiment, the first object part 56 requests the object controller 53 to control a life cycle and an execution of the first object part 56 (oneself) instead of the discard notification. The requested object controller 53 recognizes that an active processing is present in the first object part 56 which is switched to the background execution. The object controller 53 then starts to control the life cycle without discarding the first object part 56 which is switched to the background execution. This operation will be explained in detail below.

Figure 7:
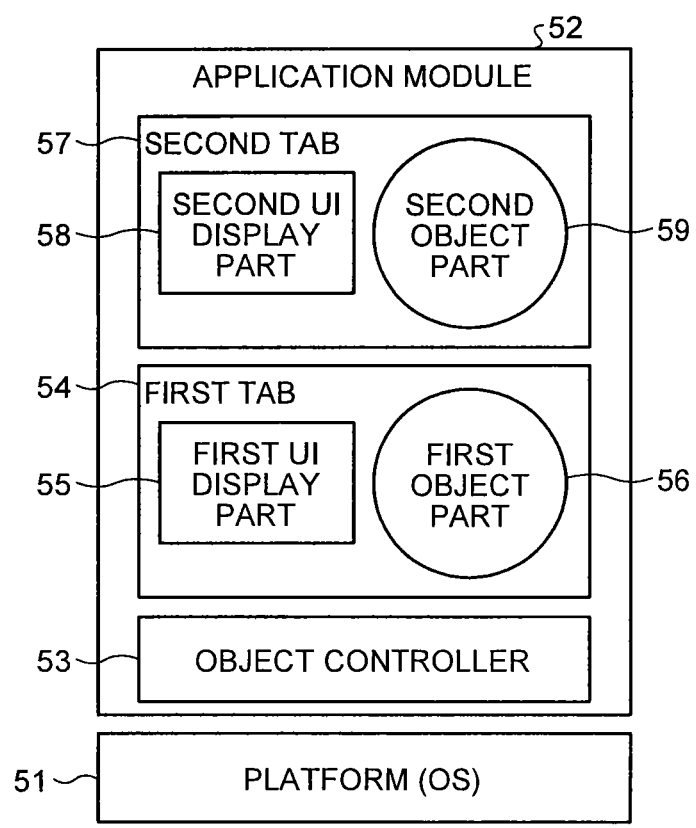
FIG. 7 is a functional block diagram for explaining a function of each of a plurality of tabs generated in the application module activated on the platform in the MFP according to the first embodiment.
Figure 8:
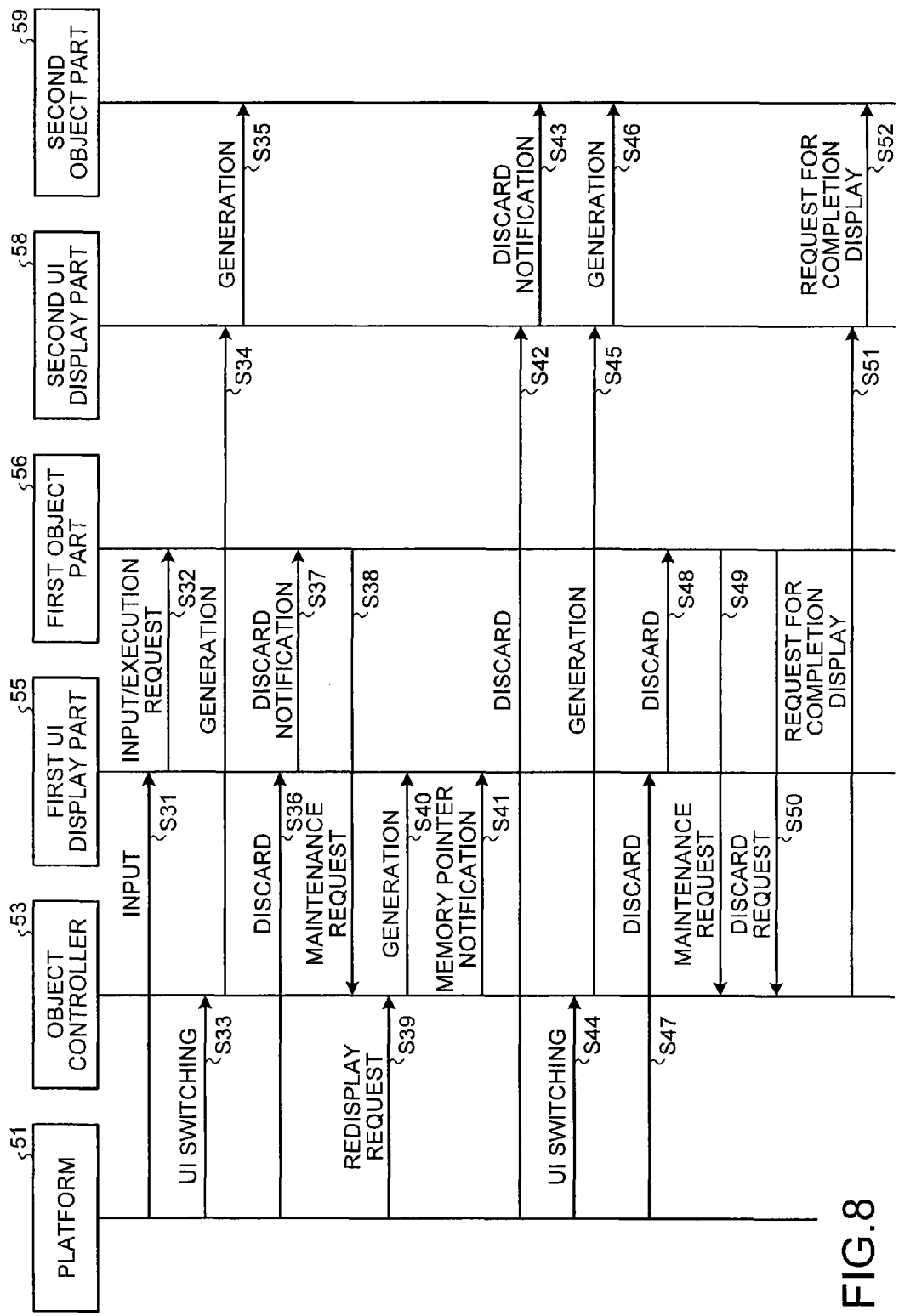
FIG. 8 is a timeline chart for explaining an operation of completing a processing of a tab which is switched to a background execution in the MFP according to the first embodiment.

As one example, two tabs illustrated in FIG. 7 are generated by requesting an application that provides a printing function to activate printing functions which are different from each other. FIG. 7 illustrates an example in which the first tab 54 is generated for a printing function whose activation is first requested and a second tab 57 is generated for a printing function whose activation is next requested. The second tab 57 has the same configuration as the first tab 54 and is provided with a second UI display part 58 and a second object part 59. FIG. 8 is a timeline chart of an operation of switching the two tabs 54 and 57.

When a print request is made to the first activated printing function by a user, the platform 51 notifies the first UI display part 55 of the first tab 54 of the print request and of an input content by the user at step S31 in the timeline chart in FIG. 8. The first UI display part 55 notifies the first object part 56 of the input content by the user to request a print execution. The first object part 56 thus executes printing.

A situation assumed next is that the user requests an activation of a different printing function during the execution of this printing since the number of sheets to print in the printing in execution in the first object part 56 is large and the printing therefore requires a long time. When the activation is requested, the platform 51 requests the object controller 53 to switch the UI at step S33. Upon the request for the UI switching, the object controller 53 newly generates the second UI display part 58 of the second tab 57 at step S34. The object controller 53 generates the second object part 59 that provides a different printing function from the first object part 56 at step S35.

Next, the platform 51 notifies the first UI display part 55 of a discard at step S36 since the second UI display part 58 is activated. The first UI display part 55 notifies the first object part 56 of the discard notification and is then discarded at step S37.

Next, the first object part 56 having received the discard notification requests the object controller 53 to maintain oneself at step S38 when the printing in execution is not completed. When the request for maintenance is made, the object controller 53 registers and maintains the first object part 56 which is in the middle of the print execution without discarding. It is thus possible to keep executing the printing by the first object part 56 which is switched to the background execution in response to the generation of the second UI display part 58.

Here, when hoping to redisplay the first object part 56, the user requests a redisplay. The redisplay request is notified from the platform 51 to the object controller 53 at step S39. As explained, the first UI display part 55 is discarded when the second UI display part 58 is generated. The first object part 56 is maintained without being discarded and the printing thereof is in the middle of execution. Therefore, the object controller 53 regenerates the first UI display part 55 which functions as an image frame in which an image of the object controller 53 is displayed at step S40.

The object controller 53 notifies the regenerated first UI display part 55 of an address of display information such as a memory pointer corresponding to the first object part 56 which is in the middle of the print execution at step S41. The first UI display part 55 uses the notified memory pointer to obtain from a memory and the like and display the object corresponding to the first object part 56. The first object part 56 in the middle of print execution is thus redisplayed.

When the first object part 56 is redisplayed, the platform 51 notifies the second UI display part 58 of a discard at step S42. The second UI display part 58 notifies the second object part 59 of this discard notification at step S43. The second UI display part 58 and the second object part 59 are thus discarded.

A situation assumed next is that an activation of another different printing function is requested again in the middle of the print execution in the first object part 56. When this activation is requested, the platform 51 requests the object controller 53 to switch the UI at step S44. Upon the request for the UI switching, the object controller 53 newly generates the second UI display part 58 of the second tab 57 at step S45. The object controller 53 generates the second object part 59 that provides a printing function different from the first object part 56 at step S46.

Next, the platform 51 notifies the first UI display part 55 of a discard at step S47 since the second UI display part 58 is activated. The first UI display part 55 notifies the first object part 56 of the discard notification and is then discarded at step S48.

Next, the first object part 56 having received the discard notification requests the object controller 53 to maintain oneself at step S49 when the printing in execution is not completed. The object controller 53 thus registers and maintains the first object part 56 which is in the middle of the print execution without discarding. It is thus possible to keep executing the printing by the first object part 56 which is switched to the background execution in response to the generation of the second UI display part 58.

Next, when the printing which is executed in the background is completed, the first object part 56 requests the object controller 53 to discard oneself at step S50. The first object part 56 is thus discarded after the printing is completed.

Next, when receiving the discard request from the first object part 56, the object controller 53 recognizes that the active processing is completed (recognizes that the printing is completed in the case of this example) and requests the second UI display part 58 to display the completion at step S51. The second UI display part 58 transfers the request for displaying the completion to the second object part 59 at step S52. The second object part 59 notifies the user of the completion of the processing which has been executed in the first object part 56 via the second UI display part 58.

Figure 9:
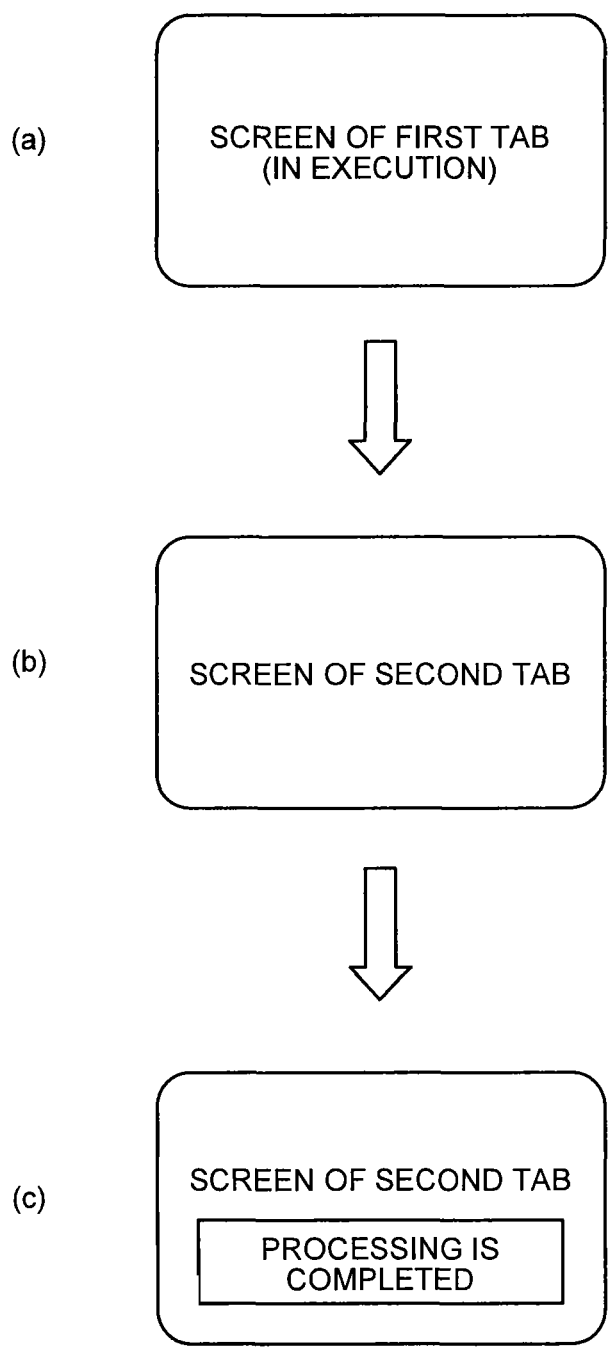
FIG. 9 is an explanatory view of an operation of displaying a completion of the processing of the tab which is switched to the background execution through a display screen of the tab currently displayed.

Drawings illustrated with references (a) to (c) of FIG. 9 show the UI switching operation and a transition of a display screen. When the processing is in the middle of execution in the first tab 54 (the first object part 56), a screen appropriate to the processing in the middle of execution in the first tab 54 is displayed, as illustrated in the drawing with the reference (a) of FIG. 9. When a different processing is requested by a user, the screen of the first tab 54 is discarded and a screen of the second tab 57 is displayed as illustrated in the drawing with the reference (b) of FIG. 9.

When there is an active processing in the first object part 56, the active processing in the first object part 56 is maintained in the background even though the screen of the first tab 54 is discarded as explained above. When the processing of the first object part 56 is completed, the completion of the processing in the first object part 56 is notified to the user (displayed) in the screen of the second tab 57 as illustrated in the drawing with the reference (c) of FIG. 9.

The drawings with the references (a) to (c) of FIG. 9 will be explained on the assumption that the processing is printing. In a situation where a user specifies an execution of a new printing function when a printing is in the middle of execution in the first tab 54 and a screen "in execution" is displayed as illustrated in the drawing with the reference (a) of FIG. 9, the screen of the first tab 54 is discarded. A screen of a new printing function is displayed by the second tab 57 as illustrated in the drawing with the reference (b) of FIG. 9. The processing, in execution in the background, of the first object part 56 is maintained even in this situation. When the printing in the first object part 56 is completed, a banner that notifies a completion of the printing in the first object part 56 is displayed on the screen of the new printing function as illustrated in the drawing with the reference (c) of FIG. 9.

As is clear in the explanation so far, the object controller 53, which is separated from the life cycle of the first UI display part 55, controls the life cycle of the first object part 56 controlled by the first UI display part 55 in the MFP 1 according to the first embodiment. It is thus possible to keep executing the active processing in the first object part 56 even after the first UI display part 55 is discarded in response to the new generation of the second UI display part 58. In other words, when, during an execution of one processing, an execution of another processing is specified, it is possible to maintain and safely complete the one processing in the background without discarding in the middle of the processing.

Second Embodiment

Next, an MFP 1 according to a second embodiment will be explained. The MFP 1 according to the first embodiment is configured to display, when the processing, in the middle of execution in the background, of the first object part 56 is completed, a banner and the like to notify the completion of the processing in the screen of the second UI display part 58. In other words, the notification of the completion of the processing of the first object part 56 is configured to be displayed with the assistance of the screen of the second UI display part 58. In contrast, the second tab 57 is discarded and the first UI display part 55 is reconstructed when the processing of the first object part 56 executed in the background is completed in an MFP 1 according to the second embodiment. Then, the completion of the processing of the first object part 56 is configured to be notified to the user. The first embodiment and the second embodiment to be explained below are different only in this point. Therefore, the difference therebetween will only be explained below and an explanation for the same part will not be made redundantly.

Figure 10:
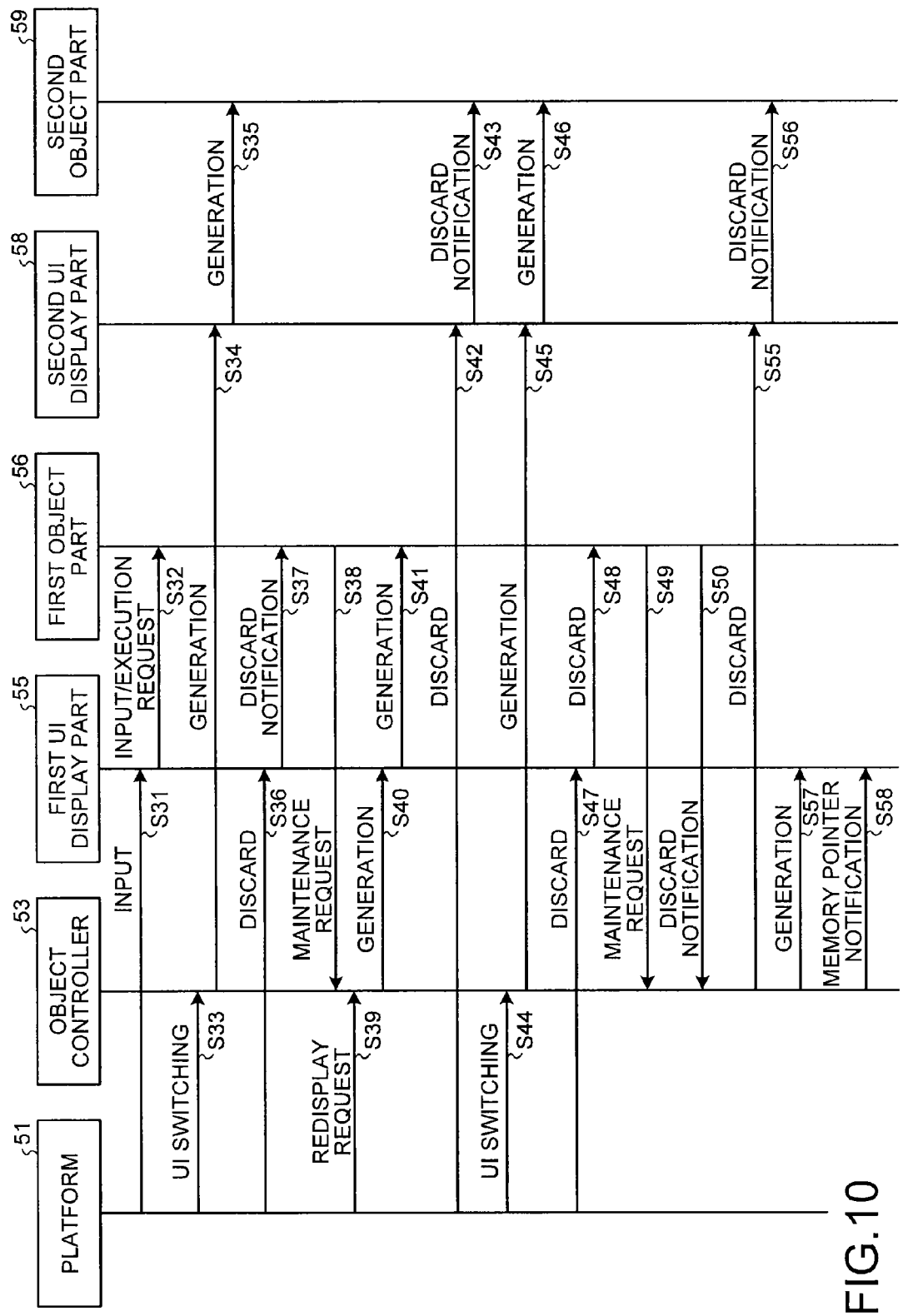
FIG. 10 is an explanatory view of an operation of displaying a completion of a processing of a tab which is switched to a background execution by reconstructing a screen of the tab switched to the background execution in an MFP according to a second embodiment.

FIG. 10 is a timeline chart for explaining an operation of the MFP 1 according to the second embodiment. In the timeline chart in FIG. 10, the operations at steps S31 to S50 are the same as the first embodiment. It is requested to refer to the explanation of the first embodiment for the details. In the timeline chart in FIG. 10, steps S55 to S58 are the processing characteristic of the MFP 1 according to the second embodiment. More specifically, the first object part 56 requests, when the processing thereof executed in the background is completed, the object controller 53 to discard oneself at step S50. Then, the first UI display part 55 and the first object part 56 are discarded.

When receiving the discard request from the first object part 56 which has been executing the processing in the background, the object controller 53 notifies the second UI display part 58 which performs the display currently of a discard at step S55. This discard request is also notified to the second object part 59 at step S56. Thus, the second UI display part 58 and the second object part 59 are discarded.

Next, the object controller 53 regenerates the first UI display part 55 which functions as an image frame and the like in which an image of the object controller 53 is displayed at step S57. The object controller 53 notifies the regenerated first UI display part 55 of an address of display information such as a memory pointer corresponding to the first object part 56 whose processing is completed at step S58. The first UI display part 55 uses the notified memory pointer and obtains from the memory and the like and displays the object corresponding to the first object part 56 whose processing is completed. The first UI display part 55 also displays a banner and the like that notifies the completion of the printing by the first object part 56.

It is thus possible in the MFP 1 according to the second embodiment to reconstruct the first UI display part 55 which is discarded when the processing, executed in the background, of the first object part 56 is completed and to notify a user of the completion of the processing via the reconstructed screen. In addition to this advantage, it is possible to obtain the same advantages as the first embodiment.

Third Embodiment

Next, an MFP 1 according to a third embodiment will be explained. The situation where a plurality of tabs like the first tab 54 and the second tab 57 are generated within the same application module 52 is taken as an example and explained in the embodiments above. However, a situation where a plurality of application modules are activated on the platform 51, which will be explained below as a characteristic of the third embodiment, follows the same operation. The difference between the embodiments already explained above and the third embodiment to be explained below is only this characteristic. Therefore, the difference therebetween will only be explained below and an explanation for the same part will not be made redundantly.

Figure 11:
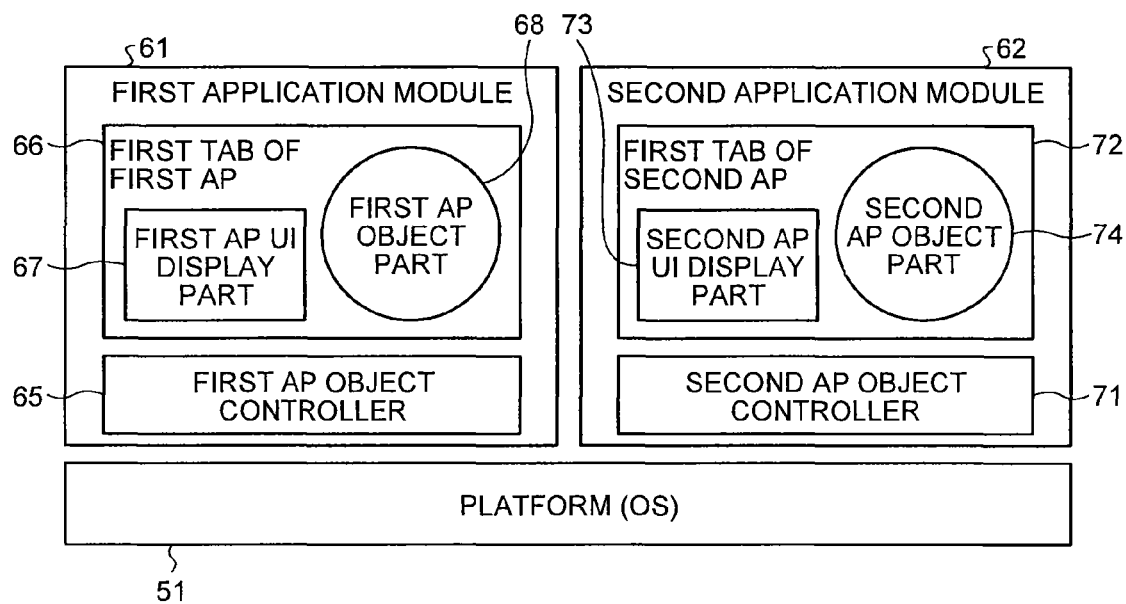
FIG. 11 is a functional block diagram for explaining each of functions of a plurality of application modules activated on a platform in an MFP according to a third embodiment.

FIG. 11 schematically illustrates a state where a plurality of application modules are activated on the platform 51 in the MFP 1 according to the third embodiment. In the situation of the example illustrated in FIG. 11, a first application module 61 and a second application module 62 are activated on the platform 51. The first application module 61 includes a first AP object controller 65 and a first tab 66 of a first AP. The first AP object controller 65 performs an object control in the first application module 61. The first tab 66 of the first AP includes a first APUI display part 67 and a first AP object part 68. The first APUI display part 67 forms an image frame and the like that allows displaying an object. The first AP object part 68 displays an obtained object and the like in the image frame formed by the first APUI display part 67.

The second application module 62, which has the same configuration, includes a second AP object controller 71 and a first tab 72 of a second AP. The second AP object controller 71 performs an object control in the second application module 62. The first tab 72 of the second AP includes a second APUI display part 73 and a second AP object part 74. The second APUI display part 73 forms an image frame and the like that allows displaying an object. The second AP object part 74 displays an obtained object and the like in the image frame formed by the second APUI display part 73.

A plurality of tabs, like the first tab 66 of the first AP and the first tab 72 of the second AP respectively of the first application module 61 and the second application module 62, are configured to be generated in respective application modules 61 and 62 based on an instruction of activating other functions by a user. The operation of tabs in the same application module is the same as explained in the first and the second embodiments.

FIG. 12 is a timeline chart of an operation flow of generating and discarding the application modules 61 and 62. When a user instructs an activation of the first application module 61 first, an activation instruction is provided from the platform 51 to the first AP object controller 65 of the first application module 61 at step S61. When the activation instruction is provided, the first AP object controller 65 generates the first tab 66 of the first AP at step S62. The first AP object controller 65 generates the first APUI display part 67 at step S62 and generates the first AP object part 68 at step S63. The first AP object part 68 then performs a registration of oneself to the first AP object controller 65 at step S64. An image (screen) of the first application module 61 is thus displayed.

When an activation of the second application module 62 is instructed by the user in this state, the platform 51 instructs an activation of the second AP object controller 71 of the second application module 62 at step S65. When this activation request is provided, the second AP object controller 71 generates the first tab 72 of the second AP at step S66. The second AP object controller 71 generates the second APUI display part 73 at step S66 and generates the second AP object part 74 at step S67. The second AP object part 74 performs a registration of oneself to the second AP object controller 71 at step S68. An image (screen) of the second application module 62 is thus displayed.

When an input is made to the second application module 62 by the user, the platform 51 notifies the second APUI display part 73 of the input by the user as shown at step S69. The second APUI display part 73 notifies the AP object part 74 of the input by the user and requests the second AP object part 74 to execute a processing appropriate to the input by the user at step S70. The processing appropriate to the input by the user is thus executed by the second application module 62.

When the second application module 62 is activated, the platform 51 notifies the first APUI display part 67 of the first application module 61 of a discard at step S71. The first APUI display part 67 transfers the discard notification to the first AP object part 68 at step S72 and is discarded.

When receiving the discard notification, the first AP object part 68 determines whether or not there is an active processing and requests the first AP object controller 65 to maintain oneself at step S73 when there is an active processing. When there is no active processing, the first AP object part 68 is discarded.

The first AP object controller 65 having received the request for maintenance recognizes that there is an active processing in the first AP object part 68 which is switched to a background execution. The first AP object controller 65 then controls and maintains the life cycle of the first AP object part 68 which is switched to the background execution without discarding.

Next, when the active processing is completed, the first AP object part 68 requests the first AP object controller 65 to discard oneself at step S74. This discard request is notified from the first AP object controller 65 to the platform 51 at step S75. When receiving the discard request, the platform 51 discards the first application module 61.

As is clear in the explanation so far, the first AP object controller 65, which is separated from the life cycle of the first APUI display part 67, controls the life cycle of the first AP object part 68 controlled by the first APUI display part 67 in the MFP 1 according to the third embodiment. It is thus possible to keep executing the active processing in the first AP object part 68 even after the first APUI display part 67 is discarded in response to a new activation of the second application module 62. In other words, when, during an execution of a processing of one application module, another application module is activated, the processing of the one application module is continued in the background. It is thus possible to prevent inconvenience that the processing of the one application module is discarded in the middle of execution and to safely complete the processing. In addition to this advantage, it is possible to obtain the same advantages as the embodiments explained above.

Program

A program to be executed in the MFP 1 according to the embodiments may be provided by being recorded in a file of an installable format or of an executable format in a computer-readable recording medium such as a CD-ROM and a flexible disk (FD). The program to be executed in the MFP 1 according to the embodiments may be provided by being recorded in a computer-readable recording medium such as a CD-R, a DVD, and a semiconductor memory, as a computer program product. Here, DVD is an abbreviation for a "digital versatile disk". The program to be executed in the MFP 1 according to the embodiments may be provided via a network such as the Internet. Besides, various programs may be provided by being preloaded in a ROM and the like in the device.

The embodiments are presented as an exemplification and are not intended to limit the scope of the invention. These new embodiments may be implemented in other various forms and various omissions, replacements, and modifications may be made without departing from the scope of the invention.

A main body 10 of a device such as an MFP is a multifunction peripheral that realizes, by one chassis, at least two functions among a printing function, a scanner function, a copying function, and a FAX transmitting/receiving function, and the like. However, a device including any one of these functions may be used as an MFP 1. The MFP 1 according to the embodiments is just one example of the device and devices such as a projector, a teleconference system, and a digital camera may be used instead of the MFP 1.

According to the embodiments of the present invention, there is an advantage that it is possible to complete a processing which is switched to an execution in the background of a browser.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation unit-equipped device, comprising:
processing circuitry configured to
generate an application module that includes a first processing executor that executes a first processing, a first display part that performs a display appropriated to the first processing executor, and a controller that controls the first processing executor and the first display part;
switch, when the first processing executor is executing the first processing, the first processing executor and the first display part to a background execution of a second processing executor and a second display part that are generated after the generation of the first processing executor and the first display part;
control the controller to execute the first processing in the background execution of the second processing executor and the second display part when the first processing executor and the first display part are switched;
issue a request to discard the first processing executor and the first display part, which are executed in the background execution of the second processing executor and the second display part;
issue, in response to the request to discard, a request to maintain the first processing executor to the controller when the first processing executor is executing the first processing, and the first processing executor issues the request to discard the first processing executor to the controller after the first processing is completed;
control the controller to discard, in response to the request to discard, the first display part and the first processing executor when the first processing executor is not executing the first processing;
control the controller to discard the first display part and maintain the first processing executor until the first processing in the first processing executor is completed when the first processing executor is executing the first processing; and
control the controller to discard the first processing executor when the first processing in the first processing executor is completed.

2. The operation unit-equipped device according to claim 1, wherein the first processing executor and the first display part constitute a tab to be generated in the application module.

3. The operation unit-equipped device according to claim 1, wherein
when a request to redisplay the discarded first display part is issued while the first processing executor to be discarded in response to the request to discard is maintained, the controller regenerates the discarded first display part and notifies the regenerated display part of an address of display information appropriate to the maintained first processing executor, and
the regenerated display part obtains the display information from the address and displays the display information.

4. The operation unit-equipped device according to claim 1, wherein the controller notifies, via the second display part, a completion of the processing after the processing in the first processing executor being maintained is completed.

5. The operation unit-equipped device according to claim 1, wherein when the request to discard is issued from the first processing executor after a completion of the processing of the first processing executor being maintained, the controller discards the second processing executor and the second display part, regenerates the display part that performs a display appropriate to the first processing executor, and notifies the completion of the processing via the regenerated display part.

6. The operation unit-equipped device according to claim 1, wherein
the generator generates a plurality of application modules each including a different processing executor, display part, and controller, the application module being a first application module,
in response to the request to discard, the first executor of the first application module issues a request to maintain the first processing executor of the first application module to the controller of the first application module when the first processing executor is executing the first processing, and issues a request to discard the first processing executor to the controller of the first application module after the first processing being executed is completed, and
in response to the request to discard, the controller of the first application module discards the first display part and the first processing executor of the first application module when the first processing executor is not executing the first processing, and the controller of the first application module discards the first display part of the first application module and maintains the first processing executor of the first application until the first processing being executed is completed, and the controller of the first application module discards the first processing executor of the first application module when the first processing being executed is completed.

7. The operation unit-equipped device according to claim 1, wherein the first processing executor and the first display part are executed in parallel, via the background execution, with the second processing executor and the second display part until the first processing executor and the first display part are discarded in response to the request to the discard.

8. An information processing method of an operation unit-equipped device, the information processing method comprising:
generating, by processing circuitry of the operation unit-equipped device, an application module that includes a first processing executor that executes a first processing, a first display part that performs a display appropriated to the first processing executor, and a controller that controls the first processing executor and the first display part;
switching, by the processing circuitry when the first processing executor is executing the first processing, the first processing executor and the first display part to a background execution of a second processing executor and a second display part that are generated after the generation of the first processing executor and the first display part;
controlling, by processing circuitry, the controller to execute the first processing in the background execution of the second processing executor and the second display part when the first processing executor and the first display part are switched;
issuing a request to discard the first processing executor and the first display part, which are executed in the background execution of the second processing executor and the second display part;
issuing, in response to the request to discard, a request to maintain the first processing executor to the controller when the first processing executor is executing the first processing, and issuing the request to discard the first processing executor to the controller after the processing is completed;
controlling the controller to discard, in response to the request to discard, the first display part and the first processing executor when the first processing executor is not executing the first processing;
controlling the controller to discard the first display part and maintain the first processing executor until the first processing in the first processing executor is completed when the first processing executor is executing the first processing; and
controlling the controller to discard the first processing executor when the first processing in the first processing executor is completed.

9. The information processing method according to claim 8, wherein the first processing executor and the first display part constitute a tab to be generated in the application module.

10. The information processing method according to claim 8, further comprising:
when a request to redisplay the discarded first display part is issued while the processing executor to be discarded in response to the request to discard is maintained, regenerating the discarded first display part and notifies the regenerated display part of an address of display information appropriate to the maintained first processing executor; and
in the regenerated display part, obtaining the display information from the address and displaying the display information.

11. The information processing method according to claim 8, further comprising:
notifying, via the second display part, a completion of the processing after the processing in the first processing executor being maintained is completed.

12. The information processing method according to claim 8, further comprising:
when the request to discard is issued from the first processing executor after a completion of the processing of the first processing executor being maintained, discarding the second processing executor and the second display part, regenerating the first display part that performs a display appropriate to the first processing executor, and notifying the completion of the processing via the regenerated display part.

13. The information processing method according to claim 8, further comprising:
generating a plurality of application modules each including a different processing executor, display part, and controller, the application module being a first application module;
in response to the request to discard in the first processing executor of a first application module, issuing a request to maintain the first processing executor of the first application module to the controller of the first application module when the first processing executor is executing the first processing, and issuing a request to discard the first processing executor to the controller of the first application module after the first processing being executed is completed; and
in response to the request to discard in the controller of the first application module, discarding the first display part and the first processing executor of the first application module when the first processing executor is not executing the first processing, and discarding the first display part of the first application module and maintaining the first processing executor of the first application until the first processing being executed is completed, and discarding the first processing executor of the first application module when the first processing being executed is completed.

14. The information processing method according to claim 8, wherein the first processing executor and the first display part are executed in parallel, via the background execution, with the second processing executor and the second display part until the first processing executor and the first display part are discarded in response to the request to the discard.

15. A non-transitory computer readable medium storing computer executable instructions that, when executed by processing circuitry of a computer, causes the computer to execute:
   generating an application module that includes a first processing executor that executes a first processing, a first display part that performs a display appropriated to the first processing executor, and a controller that controls the first processing executor and the first display part;
   switching, when the first processing executor is executing the first processing, the first processing executor and the first display part to a background execution of a second processing executor and a second display part that are generated after the generation of the first processing executor and the first display part;
   controlling the controller to execute the first processing in the background execution of the second processing executor and the second display part when the first processing executor and the first display part are switched;
   issuing a request to discard the first processing executor and the first display part, which are executed in the background execution of the second processing executor and the second display part;
   issuing, in response to the request to discard, a request to maintain the first processing executor to the controller when the first processing executor is executing the first processing, and issuing the request to discard the first processing executor to the controller after the processing is completed;
   controlling the controller to discard, in response to the request to discard, the first display part and the first processing executor when the first processing executor is not executing the first processing;
   controlling the controller to discard the first display part and maintain the first processing executor until the first processing in the first processing executor is completed when the first processing executor is executing the first processing; and
   controlling the controller to discard the first processing executor when the first processing in the first processing executor is completed.

16. The non-transitory computer readable medium according to claim 15, wherein the first processing executor and the first display part constitute a tab to be generated in the application module.

17. The non-transitory computer readable medium according to claim 15, wherein the computer is further caused to execute:
   when a request to redisplay the discarded first display part is issued while the processing executor to be discarded in response to the request to discard is maintained, regenerating the discarded first display part and notifies the regenerated display part of an address of display information appropriate to the maintained first processing executor; and
   in the regenerated display part, obtaining the display information from the address and displaying the display information.

18. The non-transitory computer readable medium according to claim 15, wherein the computer is further caused to execute:
   notifying, via the second display part, a completion of the processing after the processing in the first processing executor being maintained is completed.

19. The non-transitory computer readable medium according to claim 15, wherein the computer is further caused to execute:
   when the request to discard is issued from the first processing executor after a completion of the processing of the first processing executor being maintained, discarding the second processing executor and the second display part, regenerating the first display part that performs a display appropriate to the first processing executor, and notifying the completion of the processing via the regenerated display part.

20. The non-transitory computer readable medium according to claim 15, wherein the computer is further caused to execute:
   generating a plurality of application modules each including a different processing executor, display part, and controller, the application module being a first application module;
   in response to the request to discard in the first processing executor of a first application module, issuing a request to maintain the first processing executor of the first application module to the controller of the first application module when the first processing executor is executing the first processing, and issuing a request to discard the first processing executor to the controller of the first application module after the first processing being executed is completed; and
   in response to the request to discard in the controller of the first application module, discarding the first display part and the first processing executor of the first application module when the first processing executor is not executing the first processing, and discarding the first display part of the first application module and maintaining the first processing executor of the first application until the first processing being executed is completed, and discarding the first processing executor of the first application module when the first processing being executed is completed.

* * * * *